United States Patent [19]

Bate et al.

[11] 4,271,782
[45] Jun. 9, 1981

[54] APPARATUS FOR DISORIENTING MAGNETIC PARTICLES

[75] Inventors: Geoffrey Bate, Sunshine Canyon; Larry P. Dunn, Longmont, both of Colo.

[73] Assignee: International Business Machines Corporation, Armonk, N.Y.

[21] Appl. No.: 87,364

[22] Filed: Oct. 23, 1979

Related U.S. Application Data

[62] Division of Ser. No. 912,800, Jun. 5, 1978, Pat. No. 4,208,447.

[51] Int. Cl.³ .............................................. B05B 5/02
[52] U.S. Cl. .................................. 118/623; 335/284; 335/306; 427/48

[58] Field of Search .................. 427/47, 48; 335/303, 335/306, 284; 118/623

*Primary Examiner*—Bernard D. Pianalto
*Attorney, Agent, or Firm*—J. A. Pershon; J. Jancin, Jr.; N. L. Medlock

[57] ABSTRACT

This invention provides an improved method and apparatus for manufacturing magnetic recording media; specifically, that which is to be used in the manufacture of flexible, magnetic recording disks. The process provides a sequence of disorienting magnetic fields in different directions and of diminishing strengths to form a magnetic media in which the magnetic particles are essentially disoriented and the media is, thereby, devoid of modulated signal envelopes.

6 Claims, 8 Drawing Figures

APPARATUS FOR DISORIENTING MAGNETIC PARTICLES

This is a division of application Ser. No. 912,800 filed June 5, 1978, U.S. Pat. No. 4,208,447.

BACKGROUND OF THE INVENTION

This invention relates generally to manufacturing processes and devices used therein for the manufacture of magnetic recording media to be used in making flexible, magnetic recording disks. Specifically, this invention relates to a manufacturing process and device for providing magnetic media in which the particles are essentially unoriented.

During the production of flexible, magnetic recording media, when the magnetic particles become aligned in some particular direction (the medium becomes anisotropic), the magnetic and the recording properties are different in different directions. A preferential particle direction along the web will provide a disk with an output signal higher at that direction than along other directions and, consequently, the level of a recorded signal read from the disk will change as the disk or head rotates.

In certain uses of flexible media (such as in the manufacture of recording disks), this linear orientation is not desired. Such particle orientation with said anisotropic properties produces a modulation of the read-back signal amplitude because the azimuthal angle between the average direction of the particles and the gap of the read/write head changes along any circular path concentric with the center of the disk. It can be advantageous to have a highly linearly-oriented product when the product is to be used as a linear magnetic recording media (e.g., tape), but it is disadvantageous to have linearly-oriented products whose final end use is in the manufacture of a flexible, magnetic recording disk stamped from a coated web.

Prior to the present invention and at the present time, when a coating is needed in which the magnetic particles are not to be linearly oriented (e.g., in a flexible, magnetic recording disk), a semi-disoriented medium is obtained by physically removing the orienting magnet from the manufacturing process. Even without the use of an orienting magnet, however, the process of casting linear magnetic recording tape will still produce a certain amount of linear orientation.

PRIOR ART

U.S. Pat. No. 3,627,580 and British Pat. No. 933,762 are representative of the art relevant to the subject invention.

U.S. Pat. No. 3,627,580 is directed to the manufacture of a magnetically sensitized web by first exposing the magnetically sensitized film thereon to a strong particle-orienting magnet before it is dried and then, after it has dried, exposing the film to alternating magnetic fields of decreasing strength.

British Pat. No. 933,762 is also directed to the manufacture of magnetic recording media. It teaches a method of orienting ferromagnetic particles in a direction substantially transverse to that of the media web. With respect to ferromagnetic particles suspended in a binder which is in a fluid state, such orientation takes place while it is in a condition which permits orientation of the particles.

The British patent also teaches that additional particle orientation may be added to that achieved in the coating process by use of an orienting magnet to apply a magnetic field while the coating is still uncured.

SUMMARY OF THE INVENTION

It is especially critical to provide a spatially random, unoriented distribution of particles in the case of manufacturing magnetic recording media from which flexible, magnetic recording disks will be made. A disk is read or written along circular tracks which are concentric with the axis of rotation of that disk. A particle orientation with anisotropic (aligned in one direction) properties produces a modulation of the read-back signal amplitude. Along the direction of the particles, the output will be higher than along other directions, and the level of the signal read from the disk will change as the disk rotates (the signal envelope is modulated). Because of this, the magnetic media (e.g., a linear coated web which will be cut into disks or from which disks will be stamped) is manufactured without the application of any orienting magnetic field.

If an orienting magnet is normally in use (for example, for making magnetic tapes), it is shielded or removed when disks are to be made. This can cause practical problems because these magnets usually weight about 400 pounds. Even with shielding or removal of the magnet, the resulting media is not fully disoriented because the mechanics of the coating process themselves are capable of giving an undesirable level of orientation to the particles. It is, therefore, desirable to provide a process and an apparatus which will produce magnetic media in which the particles are essentially unoriented.

This invention utilizes a plurality of alternating magnetic fields in the manufacture of disoriented magnetic media. These fields are disposed in a specific, predetermined pattern along the direction of the media travel to influence the particles before the coating dries. The fields gradually decrease in strength in the direction of the movement of the media. Since there is no need for strong magnetic fields to be applied to the media, they may relatively be small.

Movement of the media through these gradually decreasing alternate fields with different directions causes the particles in the coating to be randomly distributed in the uncured binder which later cures and maintains the particles in this disoriented state.

DESCRIPTION OF THE INVENTION

Figure 1:
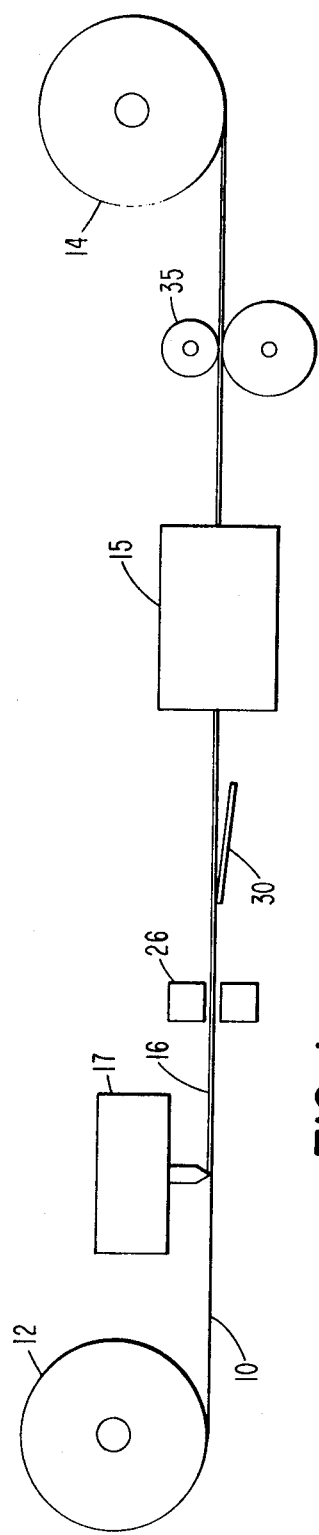
FIG. 1 is a side-elevational view, somewhat diagrammatic, of an apparatus for manufacturing magnetic recording media in accordance with the improved method of this invention.

Referring now to the drawings, FIG. 1 is a side-elevational view of an apparatus for manufacturing a linear magnetic web according to this invention wherein a substrate 10 (e.g., acetate or polyethylene terephthalate) is fed from feed reel 12 to take-up reel 14. A dispersion of magnetic particles 18 ($\gamma$-$Fe_2O_3$ or $CrO_2$) dispersed throughout a proper binder, such as polyurethane dissolved in solvents like tetrahydrofuran, is applied to substrate 10 by coater apparatus 17 which may be a gravure roll coater to form coating 16. At this point, the magnetic particles will have a certain amount of longitudinal orientation, although the particles will not be highly oriented.

Figure 5:
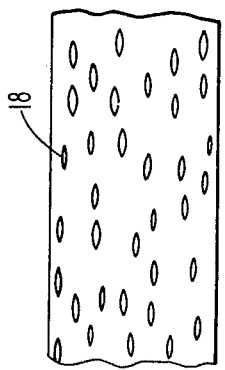
FIG. 5 is a view of magnetic particles in the coating after an orienting magnetic field step.

In linear tape manufacture, substrate 10 with uncured coating 16 thereon is typically passed through a strong, orienting magnetic field of an intensity preferably about 1500 oe, provided by magnet 26 (either a permanent magnet or an electromagnet), before drying in drying oven 15. Magnet 26 exerts a magnetic field on particles 18 in coating 16 which tends to cause the particles to physically orient themselves so that their respective axes are almost all aligned axially and parallel to one another along the length of substrate 10 (see FIG. 5).

It is desirable to use the same apparatus for coating substrates for the manufacture of both linear tapes and disks, but it is necessary to produce highly oriented media for linear tapes and media for disks which is essentially unoriented. In other words, the magnetic remanence in the coating direction ($_0Mr$) divided by the magnetic remanence in the direction normal to the coating direction ($_{90}Mr$) but still in the plane of the media must not be more than 1.05 in the media to be used in the manufacture of magnetic recording disks because at this level, no modulation of the signal envelope will be detected during replay of the recorded media. This disorientation can be achieved by the use of disorienting magnet assembly 30 and will be achieved whether the coating contains only the orientation produced by the coating process or whether it has been highly oriented by magnet 26.

Disorienting magnet assembly 30 provides a sequence of disorienting fields disposed in varying directions and of diminishing strengths between magnet 26 (if utilized) and take-up reel 14. The disorienting magnet assembly is maintained at a shallow angle (about 1.2°) to the plane of the substrate so that the magnetic fields diminish along the direction of the movement of the web from reel 12 to reel 14. The field intensity encountered by particles 18 at the proximity of the leading edge of the disorienting magnet assembly is in the range of 300–500 oe and the field intensity encountered by the particles at the proximity of the trailing edge of the disorienting magnet assembly is in the range of 5–25 oe.

Figure 7:
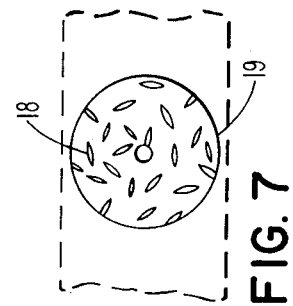
FIG. 7 is a drawing of a flexible magnetic disk cut or stamped from the coated web showing the physical arrangement of the disoriented magnetic particles.

After passing through the fields of the disorienting magnet assembly, the media travels through drying oven 15 and may go from there through callender rolls 35 before proceeding to take-up reel 14. (Callendering may also be done after curing.) The media may be further cured in another drying oven, not shown, for final solvent evaporation before it is cut into disks 19 (shown in FIG. 7).

Figure 3A:
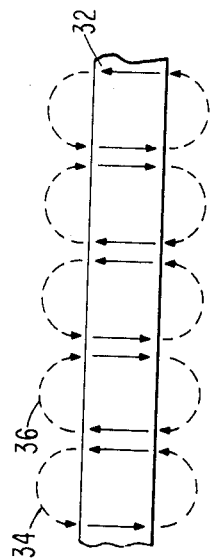
FIG. 3a is a sectional view of the premagnetized rubber magnets shown substantially along the plane designated by the line 3—3 in FIG. 2.
Figure 3B:
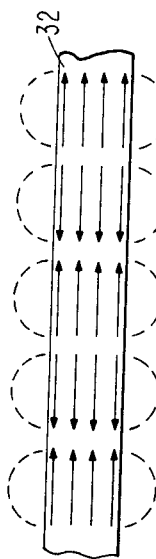
FIG. 3b, also a sectional view of the premagnetized rubber magnets along the plane designated by the line 3—3 of FIG. 2, shows another type of possible magnet orientation.

Magnet assembly 30 (FIG. 2) is comprised of strips 32 of premagnetized, flexible rubber magnets which may be made of barium ferrite, strontium ferrite, or other similar material. These strips have each been magnetized through their thicknesses in alternating bands of reversed fields as shown in FIG. 3a. Magnetic material magnetized in the plane (see FIG. 3b) could also be used to provide the desired sequence of alternating and diminishing magnetic fields.

Figure 2:
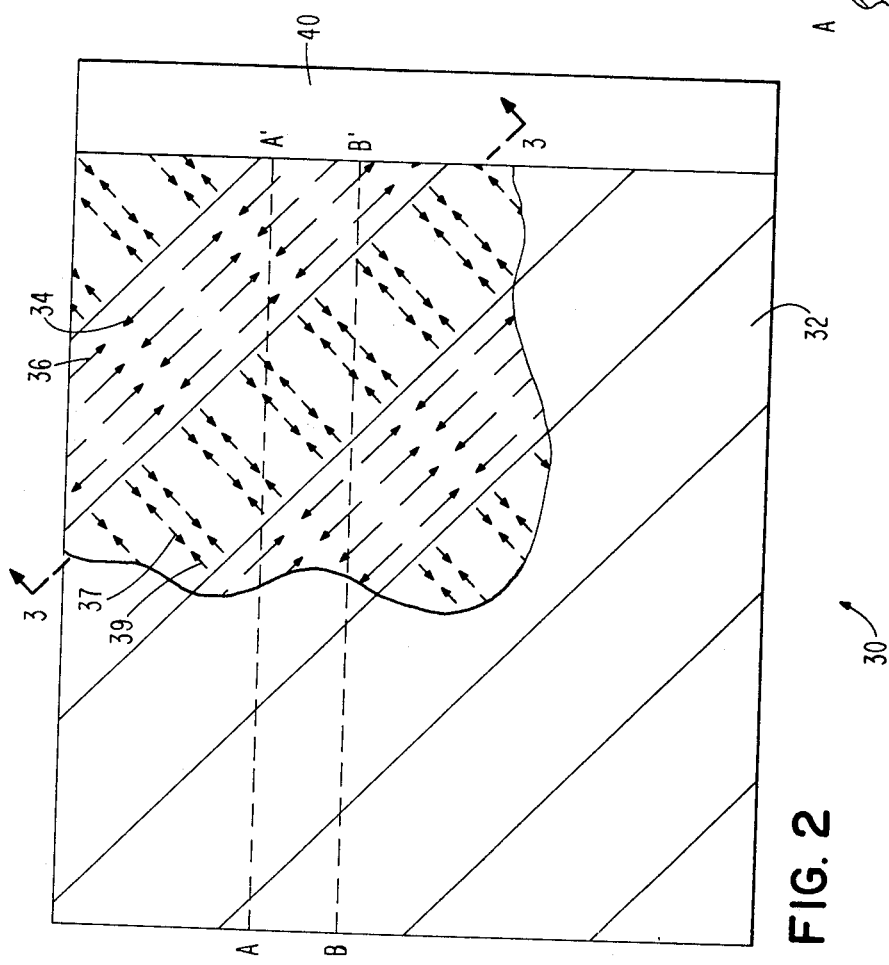
FIG. 2 is a detailed top view of the disorienting magnet assembly utilized in the invention in which the direction and orientation of the magnetic fields are partially depicted by arrows.

The magnetized strips are cut and arranged at 45° angles on a mild steel or soft iron backing plate as shown in FIG. 2 to form a series of disorienting fields 34, 36, 37 and 39. Magnetic field arrows corresponding to disorienting fields 34 and 36 represent a top view of the magnetic fields provided by the disorienting magnet assembly. The pattern shown in FIG. 2 has proven to be the most effective pattern for disorienting the magnetic particles in the coating and an angle of 45° to the path of travel of the substrate is optimum for the disorienting fields.

Figure 4:
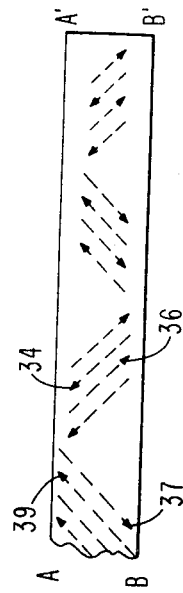
FIG. 4 shows the sequence of magnetic fields encountered by a strip of magnetic recording tape AA'—BB' as it is advanced past corresponding AA′—BB′ marks of the disorienting magnet assembly.

FIG. 4 shows a typical sequence of fields experienced by particles 18 on a section of substrate 10 limited by points AA′—BB′ in passing through corresponding limited region AA′—BB″ of the disorienting magent. A similar sequence of alternating and diminishing magnet fields could also be obtained from an array of discrete permanent magnets or electromagnets.

On its path of travel, the uncured coating with the magnetic particles therein encounters magnetic fields of diminishing strength in alternate directions and rotating orientation. The optimum angle between the plane of the disorienting magnet and that of the substrate has been found experimentally to be about 1.2°, but this angle is a function of the magnetic fields, both at the leading edge of the magnet assembly and at the trailing edge of the magnet.

Figure 6:
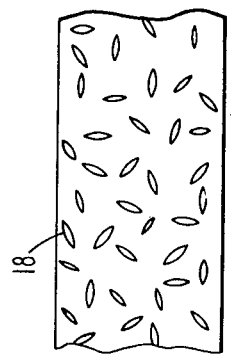
FIG. 6 shows the physical arrangement of the magnetic particles in the coating after they have been submitted to the disorienting magnet assembly.

The periodic change in the field axis from +45° to −45° and the reversal of the magnetic fields together with the progressively diminishing field strength caused by the increased distance of the magnet assembly from the substrate, ensures that the particles are not left with a preference for either one of the angles, but are randomly distributed as shown in FIG. 6. The number of field reversals to be experienced by the particles was not found to be critical and, typically, between ten and fifty reversals are provided.

The soft iron keeper 40, extending across the trailing edge of the disorienting magnet assembly (FIG. 2), smoothes the transition between the alternating fields of the magnet assembly itself and the field-free region beyond the magnet assembly. In practice, leaving off the keeper strip was found to give a streaky appearance to the coating while no streaks were found when the keeper was in place. The width of the keeper may also vary from 1 cm to 3 cm, so its dimensions do not appear to be critical.

The distance between the orienting magnet 26 and the disorienting magnet assembly 30 (FIG. 1) was also not found to be critical. Values between 10 cm and 200 cm have proved to be very acceptable.

The separation between the disorienting magnet and the coating was found to be rather critical. For a disorienting magnet 15 cm long, the space between the coating and the surface of the disorienting magnet assembly should be 2.0±0.5 mm at the upstream end and 5.0±1.0 mm at the downstream end or, more preferably, 1.6±0.1 mm at the upstream end and 4.8±0.2 mm at the downstream end. Of course, tuning the position and the angle of the disorienting magnet assembly will result in the best disorientation for each different coating used.

Although the disorienting magnet assembly could be placed adjacent to the coating side of the substrate, it is preferable to place it on the opposite side of the substrate to avoid the possibility of the coating being accidentally deposited on the face of the disorienting magnet. Such a build-up of oxide and binder would be clearly undesirable in that if allowed to proceed unchecked, it would eventually change the separation between the disorienting magnet and the coated web.

The invention herein has been described in detail with particular reference to a preferred embodiment thereof, but it will be understood by those skilled in the art that variations and modifications can be effected without departing from the spirit and scope of the invention.

What is claimed is:

1. An apparatus for magnetically disorienting magnetic particles in a solution coated on a substrate, said substrate moving in a plane, comprising:
   a first plurality of magnetic means having a first magnetic field direction;
   a second plurality of magnetic means having a second magnetic field with a second magnetic field direction, arranged so that each of said first and second plurality of magnets is juxtaposed in side-by-side relationship in alternating order; and
   connecting means for supporting the combination of said first and second pluralities of magnets in said juxtaposed alternating order along the plane of the substrate in a pattern of diminishing strength in the direction of travel of the substrate, whereby an alternating sequence of diminishing fields is created along the path of travel of said substrate;
   and characterized in that said first magnetic direction of said first plurality of magnetic means is at a first angle to the direction of movement of said substrate, and
   said second plurality of magnetic fields is juxtaposed to said first plurality of magnetic means so that the aforesaid second magnetic field direction is at a second angle disposed substantially perpendicular to that of the first magnetic field direction.

2. The apparatus in claim 1 wherein:
   the first magnetic direction of said first plurality of magnetic means is at 45° to the direction of movement of said substrate, and
   the aforesaid second magnetic field direction is at an angle of 90° to that of the first magnetic field direction.

3. The apparatus in claim 1 wherein the sequence of diminishing fields alternates at least ten times.

4. The apparatus according to claim 3 wherein the combination of said first and second plurality of magnets is arranged in a plane at an angle substantially 1.2° to that of said moving substrate, and
   the leading edge of the combination of said first and second pluralities of magnets provides a magnetic field intensity of at least 300 oersteds on said particles,
   whereby the successive magnetic fields diminish in strength upon movement of said substrate.

5. In an apparatus for manufacturing a magnetic recording tape, a stock reel having wound thereon a tape web; a take-up reel; a coater for applying magnetic particle solution to the tape, said coater arranged halfway between said stock reel and said take-up reel; and means for advancing the tape from said stock reel past said coater to the take-up reel, wherein the improvement comprises a disorienting magnet positioned adjacent said take-up reel, comprising:
   a first plurality of magnetic means having a first magnetic field direction at a first angle to the direction of movement of the tape;
   a second plurality of magnetic means having a second magnetic field with a second magnetic field direction at a second angle disposed substantially perpendicular to that of the first magnetic field direction and arranged so that each of said first and second pluralities of magnets is juxtaposed in side-by-side relationship in alternating order;
   connecting means for supporting the combination of said first and second pluralities of magnets in said juxtaposed alternating order along the plane of the tape in a pattern of diminishing strength in the direction of travel of the tape, whereby an alternating sequence of diminishing fields is created along the path of travel of said tape.

6. The apparatus in claim 5 wherein said first magnetic field direction is at 45° to the direction of movement of the tape and said second magnetic field direction is at an angle of 90° to that of the first magnetic field direction.

* * * * *